US011373531B2

United States Patent
Tanaka et al.

(10) Patent No.: US 11,373,531 B2
(45) Date of Patent: Jun. 28, 2022

(54) ATTENTION ATTRACTING DEVICE, MOBILE BODY, AND METHOD FOR CONTROLLING ATTENTION ATTRACTING DEVICE

(71) Applicant: HONDA MOTOR CO., LTD., Tokyo (JP)

(72) Inventors: Yoshiro Tanaka, Wako (JP); Keiichiro Kojima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/351,282

(22) Filed: Jun. 18, 2021

(65) Prior Publication Data

US 2021/0407296 A1 Dec. 30, 2021

(30) Foreign Application Priority Data

Jun. 29, 2020 (JP) .............................. JP2020-111166

(51) Int. Cl.
*G08G 1/16* (2006.01)
*B60Q 1/46* (2006.01)
(Continued)

(52) U.S. Cl.
CPC ................. *G08G 1/16* (2013.01); *B60Q 1/46* (2013.01); *B60Q 1/04* (2013.01); *B60Q 1/20* (2013.01); *B60Q 1/44* (2013.01)

(58) Field of Classification Search
CPC ... G08G 1/16; B60Q 1/46; B60Q 1/04; B60Q 1/20; B60Q 1/44
See application file for complete search history.

(56) References Cited

U.S. PATENT DOCUMENTS 10,696,226 B2 * 6/2020 Lewis ..................... G06V 20/64
10,816,939 B1 * 10/2020 Coleman ................. G01S 17/86
(Continued)

FOREIGN PATENT DOCUMENTS

JP 2009-042896 2/2009
JP 4825868 11/2011
(Continued)

OTHER PUBLICATIONS

Japanese Notice of Allowance for Japanese Patent Application No. 2020-111166 dated Nov. 24, 2021.

*Primary Examiner* — Mohamed Barakat
(74) *Attorney, Agent, or Firm* — Amin, Turocy & Watson, LLP

(57) ABSTRACT

An attention attracting device that effectively attracts attention and has improved versatility over a conventional technology, a mobile body including this attention attracting device, and a method for controlling the attention attracting device are provided. A predetermined area including a gazing point of a viewer is set as a central visual field at a time of the viewer directing a visual line, and an area other than the central visual field is set as a peripheral visual field. The attention attracting device includes a light source set to such a frequency F [Hz] that the light source is seen to be turned on in a case in which the light source is present in the central visual field and is seen to be blinking in a case in which the light source is present in the peripheral visual field. The mobile body includes the attention attracting device as a lamp body of a vehicle and emits light from the light source to the outside.

11 Claims, 8 Drawing Sheets

(51) Int. Cl.
  *B60Q 1/44* (2006.01)
  *B60Q 1/04* (2006.01)
  *B60Q 1/20* (2006.01)

(56) References Cited

U.S. PATENT DOCUMENTS

| | | | |
|---|---|---|---|
| 2013/0222212 A1* | 8/2013 | Lorenz | B60Q 1/00 340/425.5 |
| 2013/0249684 A1* | 9/2013 | Hatakeyama | G08G 1/167 340/435 |
| 2014/0225725 A1* | 8/2014 | Takahashi | B60K 28/066 340/439 |
| 2020/0164220 A1* | 5/2020 | Broeng | A61N 5/0622 |
| 2020/0214559 A1* | 7/2020 | Krueger | A61B 3/113 |

FOREIGN PATENT DOCUMENTS

| | | |
|---|---|---|
| JP | 2011-240868 | 12/2011 |
| JP | 2016-068791 | 5/2016 |

\* cited by examiner

ATTENTION ATTRACTING DEVICE, MOBILE BODY, AND METHOD FOR CONTROLLING ATTENTION ATTRACTING DEVICE

CROSS-REFERENCE TO RELATED APPLICATION

Priority is claimed on Japanese Patent Application No. 2020-111166, filed Jun. 29, 2020, the content of which is incorporated herein by reference.

BACKGROUND OF THE INVENTION

Field of the Invention

The present invention relates to an attention attracting device, a mobile body, and a method for controlling an attention attracting device.

Description of Related Art

Conventionally, in a signal lamp or the like that presents information to a viewer by emitting light, various technologies for attracting attention of a viewer in accordance with certain situations have been proposed.

For example, in Patent Document 1 (U.S. Pat. No. 4,825,868), a configuration of a vehicle alarm device including a virtual image displaying means displaying a virtual image at a display position set in advance within a forward visual field of a driver and an alarm sound outputting means outputting an alarm sound that prompts a driver to pay attention, for example, when an obstacle is detected in front thereof has been disclosed. In the vehicle alarm device, virtual image display is performed a first time after output of an alarm sound, and virtual image display is performed a second time after a predetermined time or more has elapsed after the start of output of the alarm sound. This predetermined time is a time required for a driver who is looking aside to direct his or her visual line forward. According to the technology disclosed in Patent Document 1, by performing the virtual image display the first time and the second time, it is assumed that a driver can be prompted to look forward appropriately and quickly.

SUMMARY OF THE INVENTION

Conventionally, a signal lamp and the like present information to a viewer or prompt attention attracting by being visually recognized by a viewer in an emitting state. For this reason, in a conventional signal lamp, in a case in which a visual line of a viewer deviates, there is concern that attention cannot be effectively attracted.

In addition, in the technology disclosed in Patent Document 1, a virtual image is displayed by the virtual image displaying means when a sensor detects an obstacle, and thus attention is attracted only in a predetermined status that can be detected by a sensor or the like. For this reason, particularly, in a case in which the technology is used for a signal lamp or the like of a vehicle for which attention needs to be attracted for risks from all directions, there is concern that a use range that can be used as an attention attracting device may be limited.

An object of the present invention is to provide an attention attracting device that effectively attracts attention and has improved versatility over a conventional technology, a mobile body including this attention attracting device, and a method for controlling an attention attracting device.

An attention attracting device, a mobile body, and a method for controlling an attention attracting device according to the present invention have the following configurations.

(1) An attention attracting device according to an aspect of the present invention includes: a light source set to such a frequency that the light source is seen to be turned on in a case in which the light source is present in a central visual field and is seen to be blinking in a case in which the light source is present in a peripheral visual field when a predetermined area including a gazing point of a viewer is set as the central visual field at a time of the viewer directing a visual line, and an area other than the central visual field is set as the peripheral visual field.

(2) In the attention attracting device according to the aspect (1), the light source may prompt the viewer to pay attention by blinking in the peripheral visual field of the viewer.

(3) In the attention attracting device according to the aspect (1) or (2), the light source may be set to the predetermined frequency by alternately repeating an on state in which the light source is caused to emit light and an off state in which the light source is turned off, and an on-pulse time for which the on state is maintained once may be longer than an off-pulse time for which the off state is maintained once.

(4) In the attention attracting device according to the aspect (3), the central visual field may be set to a range within 20° of the visual line of the viewer, and in the light source, the on-pulse time may be set to be equal to or longer than 14 ms and equal to or shorter than 25 ms, and the off-pulse time may be set to be equal to or longer than 1 ms and equal to or shorter than 5 ms.

(5) A mobile body according to an aspect of the present invention includes: the attention attracting device according to any one of the aspects (1) to (4), in which light from the light source is emitted to the outside.

(6) In the mobile body according to the aspect (5), the light source may be used as a lamp body of a vehicle.

(7) In the mobile body according to the aspect (6), the light source may be used as a headlight of the vehicle, and the light source may be caused to emit light forward from the vehicle.

(8) In the mobile body according to the aspect (6) or (7), the light source may be used as a brake light of the vehicle.

(9) In the mobile body according to any one of the aspects (5) to (8), a plurality of light sources may be disposed in a width direction that is orthogonal to a traveling direction, and frequencies of the plurality of light sources may be equal.

(10) In the mobile body according to any one of the aspects (5) to (8), a plurality of light sources may be disposed in a width direction that is orthogonal to a traveling direction, and frequencies of at least one pair of light sources among the plurality of light sources may be different from each other.

(11) A method for controlling an attention attracting device according to an aspect of the present invention is a method for controlling an attention attracting device that is used for controlling the attention attracting device disposed in the mobile body according to any one of the aspects (5) to (10), the method including: changing the frequency of the light source in accordance with a state of the mobile body within a range of a frequency band in which the light source is seen to be turned on in a case in which the light source is present in the central visual field and is seen to be blinking in a case in which the light source is present in the peripheral visual field.

According to the aspect (1), the light source disposed in the attention attracting device is set to such a frequency that the light source is seen to be turned on in a case in which it is present in the central visual field and is seen to be blinking in a case in which it is present in the peripheral visual field. Here, it is known that the visual field of a person has higher time resolution in the peripheral visual field than in the central visual field positioned in front of the visual line including the gazing point. For this reason, when the light source is caused to emit light at a specific frequency, in the central visual field, blinking cannot be detected, and thus the light source is seen to continuously remain on. When the light source deviates from the central visual field and enters the peripheral visual field, blinking can be detected. By setting such a frequency, the light source positioned in the peripheral visual field of the viewer is blinking and appears to move strongly in the pupil or retina of the viewer, and thus the viewer can be caused to gaze in the direction of the light source. Thus, the viewer is prompted to pay attention in the peripheral visual field far from the gazing point of the viewer, and a risk from an unexpected direction can be easily sensed.

On the other hand, in the central visual field, the light source is seen to be turned on, and thus, when the viewer gazes at the light source, inconvenience due to blinking of the light source can be reduced. In addition, in a case in which the position of the light source moves from the central visual field to the peripheral visual field, an appearance change can be large in accordance with changing from remaining on to blinking. In accordance with this, the visibility of the light source is improved, and the effect of attention attracting can be further improved. In addition, since switching between on and blinking of the light source is performed in accordance with visual characteristics of humans, switching to a blinking operation is not required through communication using a sensor and the like. Thus, compared to a conventional technology in which switching to a display operation or a blinking operation is performed based on a detection result acquired by a sensor or the like, the attention attracting device can be applied for a wider variety of purposes and situations.

Therefore, the attention attracting device that effectively performs attention attracting and has improved versatility over the conventional technology can be provided.

According to the aspect (2), the light source attracts attention of the viewer by blinking in the peripheral visual field of the viewer. In accordance with this, the attention attracting device having a simple configuration and capable of effective attention attracting using visual characteristics of humans can be acquired.

Particularly, for example, by using such a light source for an advertisement requiring gazing, various display lamps, and the like during driving, the viewer can more easily direct his or her visual line in the direction of the light source, and attention attracting can be effectively performed for various uses.

According to the aspect (3), the light source is set to a predetermined frequency by alternately repeating the on state in which the light source is caused to emit light and the off state in which the light source is turned off. For example, a light emitting diode (LED) is used as such a light source. One on-pulse time is longer than one off-pulse time. By setting the frequency of the light source as such, the light source can be seen to be turned on in a case in which it is present in the central visual field and can be seen to be blinking in a case in which it is present in the peripheral visual field. In a case in which the LED is used, by only changing the on-pulse time and the off-pulse time, the operations described above can be performed. Thus, a component such as a frequency conversion device does not need to be additionally provided, and the effects of the attention attracting device can be improved using a simple configuration.

According to the aspect (4), the central visual field is set to a range within 20° of the visual line of the viewer. The on-pulse time of the light source is set to be equal to or longer than 14 ms and equal to or shorter than 25 ms, and the off-pulse time is set to be equal to or longer than 1 ms and equal to or shorter than 5 ms. In accordance with this, the light source is seen to be turned on in the central visual field within 20° (in other words, within the viewing angle 20°) from the center (the gazing point) of the visual line of the viewer. The light source is seen to be blinking in the peripheral visual field that is outside of the viewing angle 20° from the gazing point. Thus, the attention attracting device capable of effectively attracting attention in the peripheral visual field of the viewer can be provided.

In addition, by using a combination of the on-pulse time and the off-pulse time, for example, appearance characteristics such as brightness and strength of blinking (visibility of blinking) of the light source can be changed in accordance with a use. Therefore, the versatility of the attention attracting device can be improved.

According to the aspect (5), the mobile body includes the attention attracting device described above and emits light from the light source to the outside. Such a light source, for example, may be a light source that is disposed inside the mobile body and emits light to leak to the outside from the inside or a light source that is disposed outside the mobile body and emits light to the outside. In accordance with this, light of the light source of the mobile body can be visually recognized by at least pedestrians present in a periphery of the mobile body, drivers riding in other mobile bodies, and the like. Thus, the pedestrians, the drivers of the other mobile bodies, and the like can be effectively prompted to pay attention and can be made to recognize an approach of the mobile body and the like. Particularly, in a situation in which the viewer needs to focus such as during driving, attention attracting is prompted in the peripheral visual field far from the gazing point of the viewer, and a risk from an unexpected direction can be easily sensed. In accordance with this, for example, the visibility of the mobile body seen by pedestrians and drivers of the other mobile bodies can be improved.

Therefore, the mobile body including the attention attracting device that effectively performs attention attracting and has improved versatility over the conventional technology can be provided.

According to the aspect (6), as a lamp body of the vehicle, the light source is used. By substituting various lamp bodies such as the headlights and taillights mounted in the vehicle in advance with the light source described above and using the light source, the attention attracting device can be easily mounted in the vehicle. In addition, inside such lamp bodies, a main lamp and a lamp for attracting attention may be provided as separate bodies. In such a case, the versatility of the attention attracting device mounted in the vehicle can be improved.

According to the aspect (7), the light source is used as the headlight of the vehicle, and the light source is caused to emit light forward from the vehicle. By using a lamp as both the light source for attention attracting and the headlight of the vehicle, the configuration of lighting components mounted in the vehicle is simplified, and the number of components can be reduced. Since the headlight functions as the attention attracting device, for example, when the light from the headlight enters the peripheral visual field of a pedestrian present in front of the vehicle, the headlight is seen to be blinking, and thus the presence of the vehicle can be easily noticed. Thus, pedestrians can be effectively made to pay attention. In addition, for example, when the light from the headlight of a following vehicle enters the peripheral visual field of the driver through a rearview mirror or a side-view mirror, the headlight is seen to be blinking, and thus the presence of the following vehicle can be easily noticed. Accordingly, the surrounding situation can be appropriately perceived.

According to the aspect (8), the light source is used as the brake light of the vehicle. By using a lamp as both the light source for attention attracting and the brake light of the vehicle, the configuration of lighting components mounted in the vehicle is simplified, and the number of components can be reduced. Since the brake light functions as the attention attracting device, for example, when the brake light enters the peripheral visual field of a driver of a following vehicle traveling behind its own vehicle, the brake light is seen to be blinking, and thus the presence of the own vehicle can be easily noticed. Thus, the driver of the following vehicle can be effectively made to pay attention.

According to the aspect (9), a plurality of light sources are disposed in a width direction that is orthogonal to the traveling direction, and the frequencies of the plurality of light sources are equal. By causing the plurality of light sources to blink in synchronization with each other, the light sources can be easily recognized as one mobile body even from a distance. For example, in a case in which a plurality of light sources are disposed in a horizontal direction (a vehicle width direction) of the vehicle, a four-wheeled vehicle and a two-wheeled vehicle can be easily distinguished based on distances between the plurality of light sources. In this way, the surrounding situation can be appropriately perceived.

According to the aspect (10), the plurality of light sources are disposed in the width direction that is orthogonal to the traveling direction, and the frequencies of at least one pair of light sources among the plurality of light sources are different from each other. Since blinking operations of one pair of light sources are different from each other, the viewer is made to feel a sense of discomfort, and a stronger attention attracting action can be achieved.

According to the aspect (11), the frequency of the light source is changed in accordance with the state of the mobile body in a range of the frequency band in which the light source is seen to be turned on in a case in which it is present in the central visual field, and the light source is seen to be blinking in a case in which it is present in the peripheral visual field. The frequency of the light source is controlled, for example, based on various states of the mobile body such as a moving speed, presence/absence of urgent braking, and the like of the mobile body. In accordance with this, more effective attention attracting can be prompted in accordance with certain situations. Since attention attracting can be prompted for a wider variety of situations, the use of the attention attracting device mounted in the mobile body can be expanded.

Therefore, the method for controlling the attention attracting device that is used for controlling the attention attracting device that effectively performs attention attracting and has improved versatility over the conventional technology can be provided.

DETAILED DESCRIPTION OF THE INVENTION

Hereinafter, an embodiment of the present invention will be described with reference to the drawings.
(Mobile Body)

Figure 1:
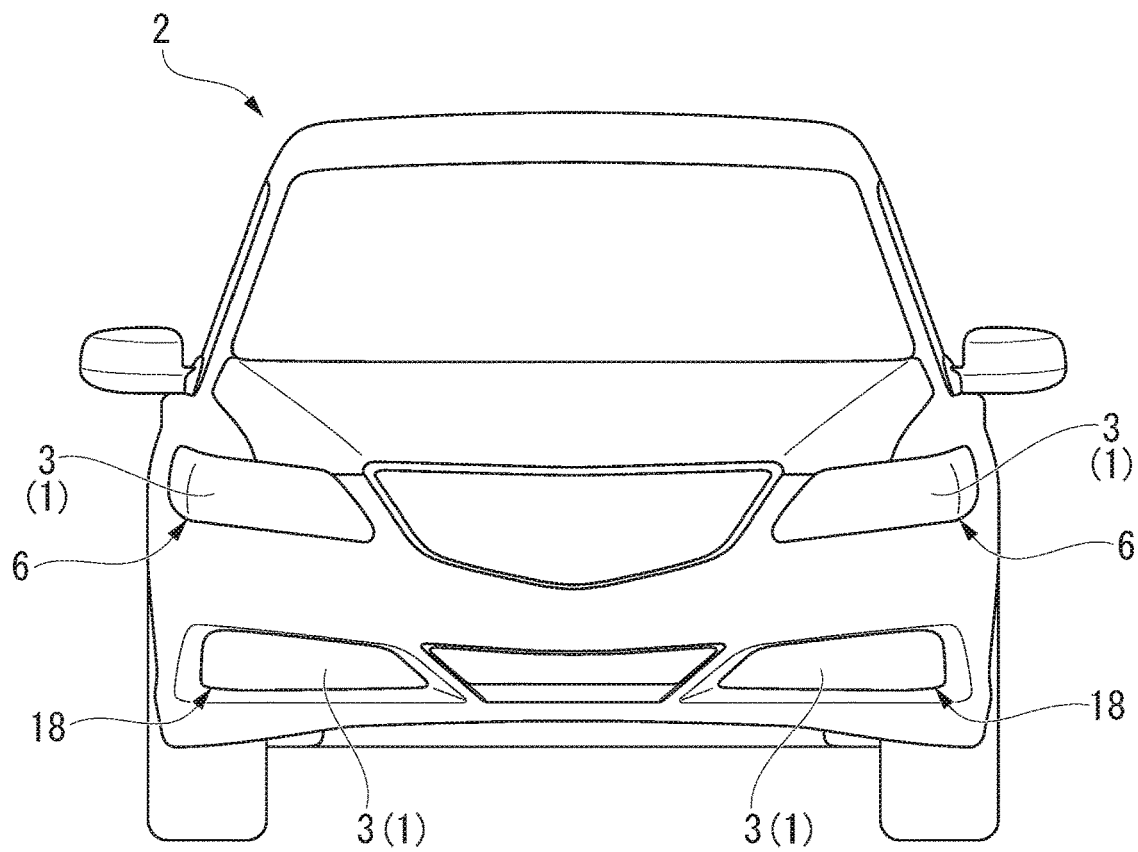
FIG. 1 is a front view of a mobile body including an attention attracting device according to an embodiment.

FIG. 1 is a front view of a mobile body 2 including an attention attracting device 1 according to an embodiment.

In this embodiment, as an example of the use of the attention attracting device 1, the attention attracting device 1 is mounted in the mobile body 2. The mobile body 2 includes the attention attracting device 1 that has a light source 3 and emits light from the light source 3 to the outside. For example, the mobile body 2 is a vehicle such as a vehicle or a motorcycle. In this embodiment, an example in which the light source 3 of the attention attracting device 1 is used as a lamp body of a vehicle (four-wheeled vehicle) will be described.

More specifically, the light source 3 of the attention attracting device 1 is used as a headlight 6 and a brake light 7 (see FIG. 8) of the vehicle. The light source 3 used as the headlight 6 emits light forward from the vehicle. The headlight 6 may include a daytime running lamp. The light source 3 used as the brake light 7 emits light rearward from the vehicle. A plurality of (in this embodiment, one pair of) light sources 3 are disposed in a vehicle width direction (a width direction orthogonal to a moving direction in the claims). One pair of light sources 3 are disposed at positions corresponding to left and right headlights 6 or brake lights 7. In more detail, the one pair of light sources 3 aligned in the vehicle width direction are set to equal pulse conditions (frequencies) to be described below.

In addition, the attention attracting device 1 may be used as light sources 3 of fog lamps 18 that are turned on through day and night, other position lights (not shown), and the like in addition to the headlights 6 and the brake lights 7 of the vehicle. Main lamps configuring the headlights 6 and the like and lamps (the light sources 3) configuring the attention attracting device 1 may be separately configured. In a case in which the light sources 3 of the attention attracting device 1 are used as light sources 3 of the fog lamps 18, the position lights, and the like that can be visually recognized in a wider range, the visibility of the attention attracting device 1 is improved, and attention attracting can be performed more effectively.

(Attention Attracting Device)

Figure 2:
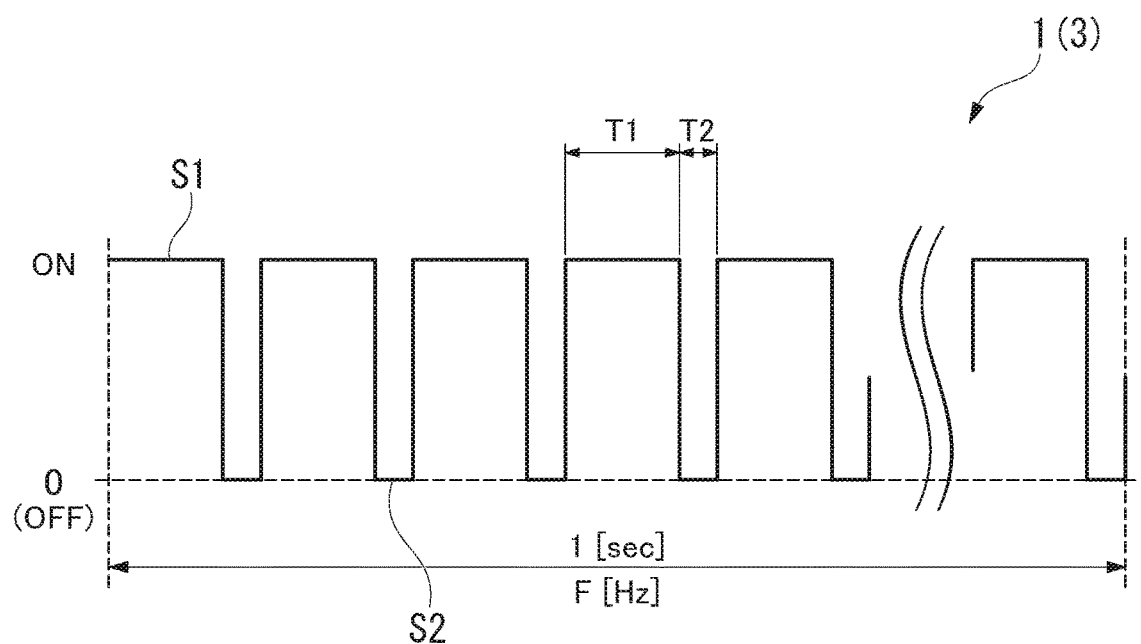
FIG. 2 is a waveform chart showing a frequency of light sources of the attention attracting device according to the embodiment.
Figure 3:
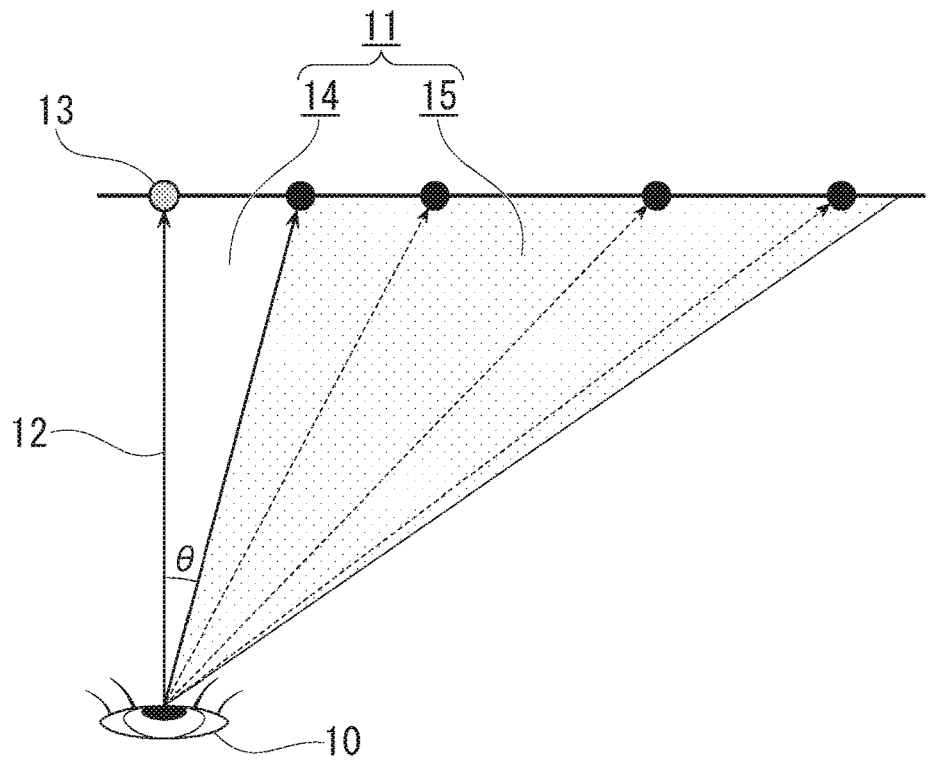
FIG. 3 is an explanatory diagram showing a relation between a viewing angle and a visual field of a viewer in a horizontal direction.
Figure 4:
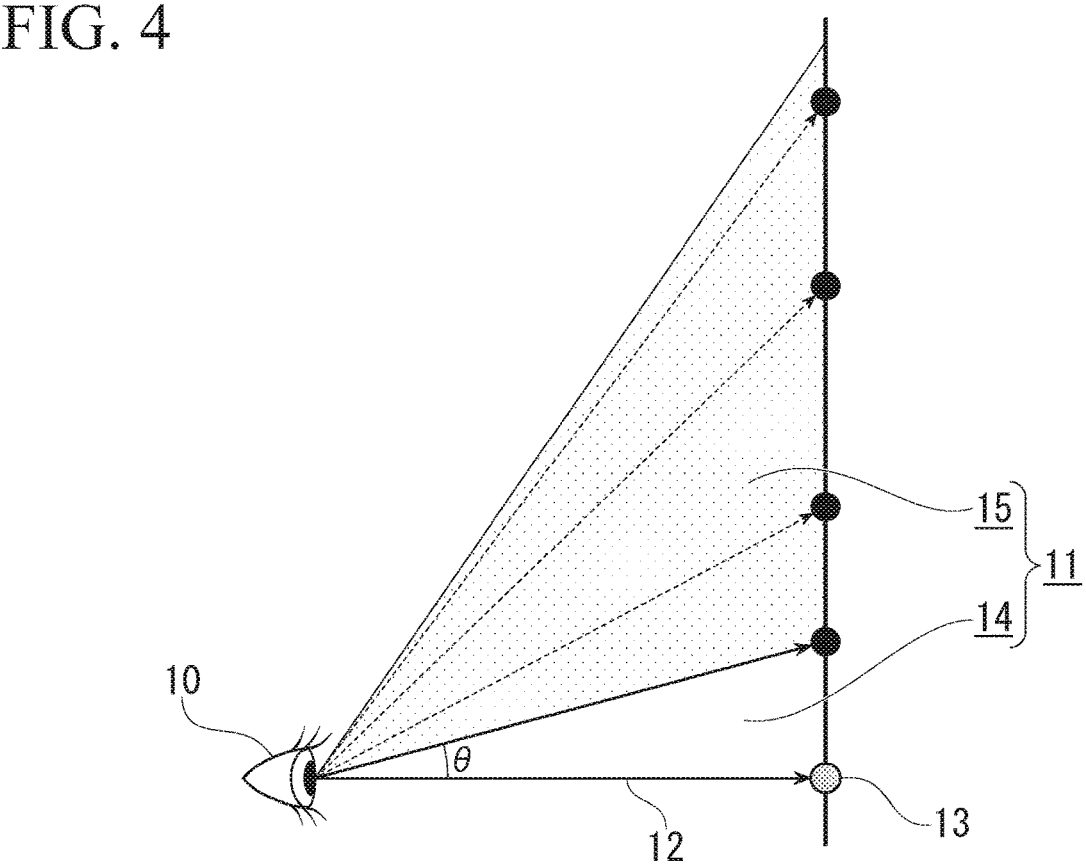
FIG. 4 is an explanatory diagram showing a relation between a viewing angle and a visual field of a viewer in a vertical direction.

FIG. 2 is a waveform chart showing a frequency F of the light sources 3 (see FIG. 1) of the attention attracting device 1 according to the embodiment. FIG. 3 is an explanatory diagram showing a relation between a viewing angle θ and a visual field 11 of a viewer 10 in a horizontal direction. FIG. 4 is an explanatory diagram showing a relation between a viewing angle θ and a visual field 11 of a viewer 10 in a vertical direction.

As shown in FIG. 2, the attention attracting device 1 includes the light source 3 that is switchable between on/off in a pulse with a predetermined frequency F. For example, the light source 3 is an LED or the like that is controlled such that an on state S1, which is a turned-on state, and an off state S2, which is a turned-off state, are alternately repeated with a predetermined period. In the following description, a time for which the on state S1 is maintained once will be referred to as an on-pulse time T1. In addition, a time for which the off state S2 is maintained once will be referred to as an off-pulse time T2. The light source 3 of the attention attracting device 1 is configured to be capable of attracting attention of the viewer 10 by blinking in a peripheral visual field 15 of the viewer 10 (see FIG. 3).

Here, as shown in FIGS. 3 and 4, a visual field of a person is largely divided into a central visual field 14 and a peripheral visual field 15. The central visual field 14 is a cone-shaped predetermined area including a gazing point 13 of a viewer 10 when the viewer 10 directs a visual line 12 in a predetermined direction. For example, the central visual field 14 is set to have a viewing angle θ in a range of 20° from the visual line 12 of the viewer 10. The central visual field 14 is positioned at the center of the visual field and has superior shape recognition, and thus a person may easily pay attention to an object within the central visual field 14. The peripheral visual field 15 is an area other than the central visual field 14 that is positioned outside of the central visual field 14 in the visual field of the viewer 10. In the peripheral visual field 15, it is generally known that, although shape recognition is inferior to that in the central visual field 14, recognition of motion is superior to that in the central visual field 14. In other words, the peripheral visual field 15 has higher time resolution than the central visual field 14. By using such visual field characteristics of humans, the light source 3 of the attention attracting device 1 according to the embodiment is set to such a frequency F that, when the viewer 10 directs the visual line 12 to the light source, the light source is seen to be turned on in a case in which the light source 3 is present in the central visual field 14 of the viewer 10, and the light source is seen to be blinking in a case in which the light source 3 is present in the peripheral visual field 15.

Figure 5:
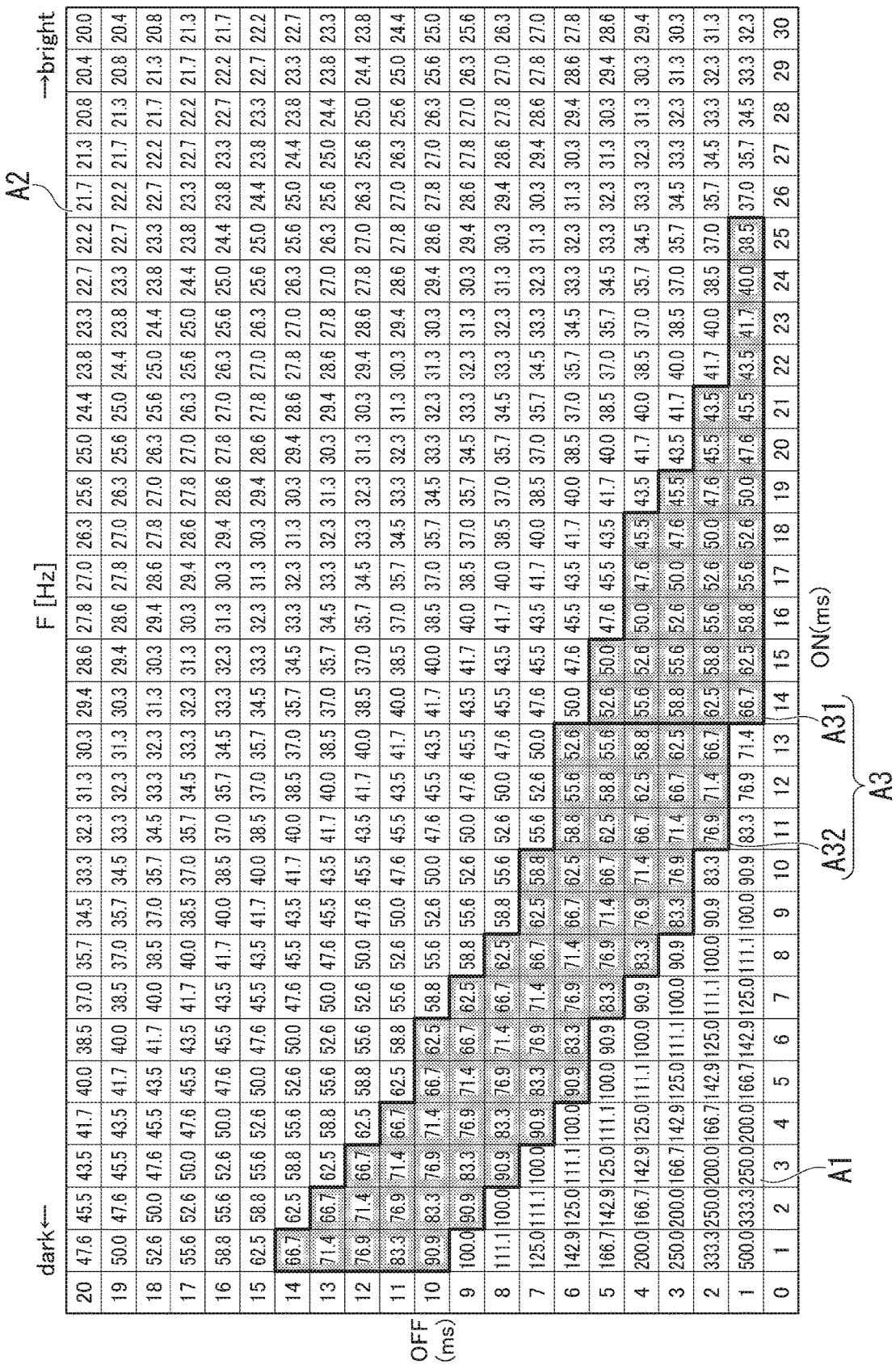
FIG. 5 is a graph showing a usable frequency range of a light source according to an embodiment.

FIG. 5 is a graph showing the range of a usable frequency F of the light source 3 according to the embodiment. In the graph, the horizontal axis represents an on-pulse time T1. In the graph, the vertical axis represents an off-pulse time T2. Each value written within the graph indicates the frequency F (unit: Hz) of the light source 3 in a case in which the light source 3 is caused to emit light with a corresponding on-pulse time T1 and off-pulse time T2. In the following description, setting conditions of the light source 3 including the frequency F, the on-pulse time T1, and the off-pulse time T2 may be referred to as pulse conditions. An area A1 shown in FIG. 5 is a range of pulse conditions used in a conventional technology and represents a range of pulse conditions under which the light source 3 is seen to be turned on in both the central visual field 14 and the peripheral visual field 15. An area A2 represents a range of pulse conditions under which the light source 3 is seen to be blinking in both the central visual field 14 and the peripheral visual field 15. An area A3 represents a range of usable pulse conditions under which the light source 3 can be used as the attention attracting device 1 according to this embodiment. In the graph, the light source 3 becomes brighter in an area further to the right.

As shown in FIG. 5, the usable area A3 of pulse conditions according to this embodiment is disposed between the area A1 representing the range of pulse conditions used in the conventional technology and the area A2 representing the range of pulse conditions under which the light source 3 is seen to be blinking in both the central visual field 14 and the peripheral visual field 15. Under the pulse conditions of the area A1 used in the conventional technology, blinking is not visually perceived. The frequency F is equal to or higher than 70 Hz and equal to or lower than 500 Hz in the area A1. In the conventional technology, by setting such pulse conditions, the light source is seen to continuously remain on while both brightness of the light source and energy saving are achieved. Under the pulse conditions of the area A2, the light source 3 is conceived to be blinking in any visual field. The frequency F is equal to or higher than 20 Hz and is lower than 65 Hz in the area A2. When pulse conditions of the light source 3 are within the usable area A3, the light source 3 is seen to continuously remain on in a case in which the light source 3 is present in the central visual field 14 of the viewer 10 and is seen to be blinking in a case in which the light source 3 is present in the peripheral visual field 15. In this embodiment, the frequency F of the light source 3 in the usable area A3 is equal to or higher than about 35 Hz and equal to or lower than 90 Hz.

The usable area A3 can be further divided into a practical area A31 and a non-practical area A32 that is darker than the practical area A31. The practical area A31 is an area in which the light source 3 can be switched between remaining on and blinking in the central visual field 14 and the peripheral visual field 15, and the light source 3 has sufficient brightness. The light source 3 of the attention attracting device 1 is more preferably used under pulse conditions of the practical area A31 in the usable area A3. More specifically, the frequency F of the light source 3 is set to be equal to or higher than about 35 Hz and lower than 70 Hz in the practical area A31. In the practical area A31, when the range within 20° of the visual line 12 of the viewer 10 is set as the central visual field 14, the light source 3 is set such that an on-pulse time T1 is equal to or longer than 14 ms and equal to or shorter than 25 ms, and an off-pulse time T2 is equal to or longer than 1 ms and equal to or shorter than 5 ms. The on-pulse time T1 of the light source 3 is longer than the off-pulse time T2 in the practical area A31 (see FIG. 2). As pulse conditions of the light source 3, it is more preferable to use median values (values of a hatched part in FIG. 5) within the practical area A31. In this embodiment, a median value of the frequency F in the practical area A31 is about 50 to 55 Hz. By using such pulse conditions, the effect of attention attracting using the light source 3 can be easily achieved more efficiently.

The values of the graph shown in FIG. 5 are examples representing experiment values. Such values and the range of the practical area A31 may change, for example, in accordance with individual differences between viewers 10 who are targets, the use of the attention attracting device 1, and the like.

Figure 6:
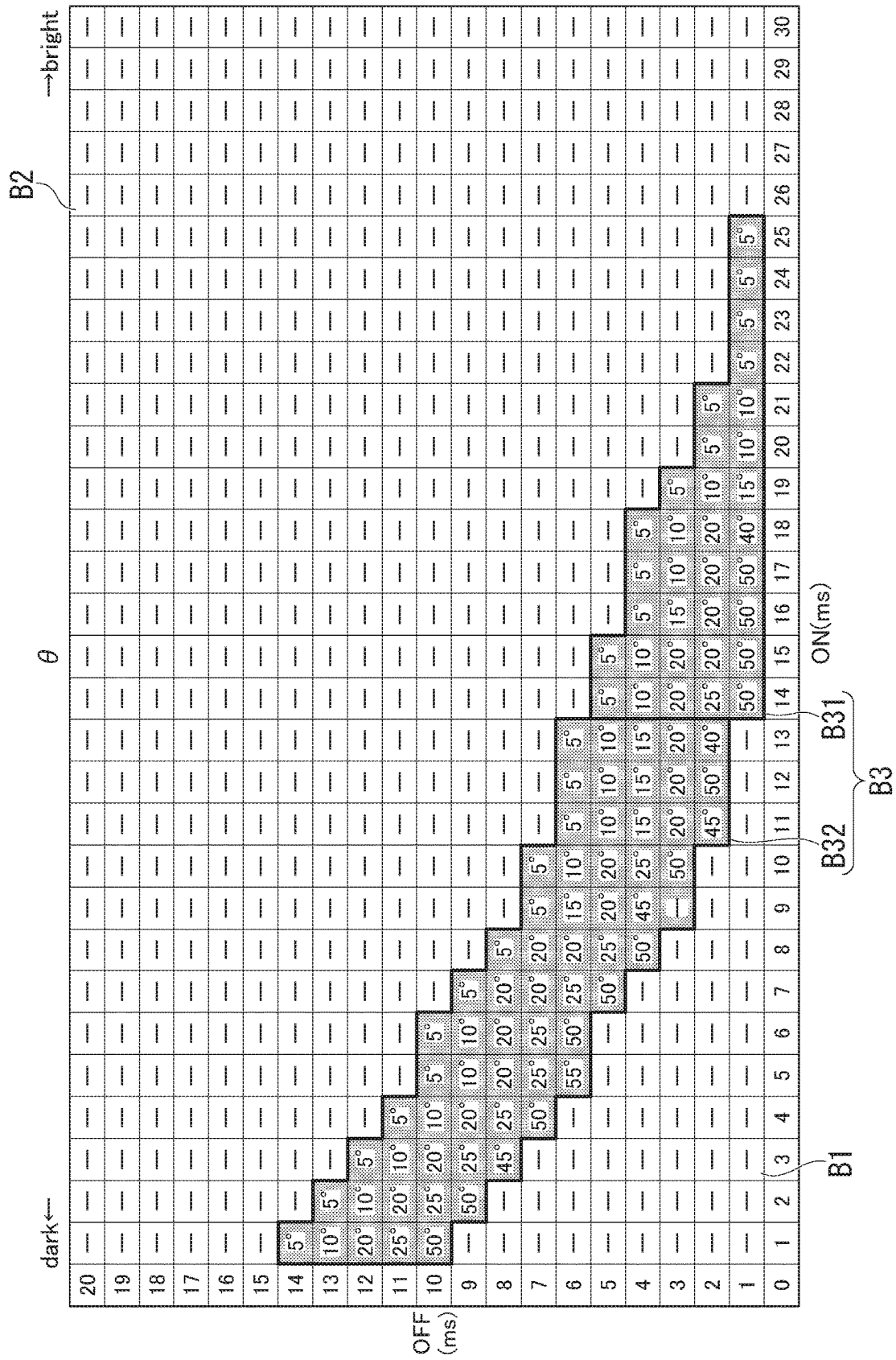
FIG. 6 is a graph showing a relation between a viewing angle of a viewer in a horizontal direction and usable pulse conditions.
Figure 7:
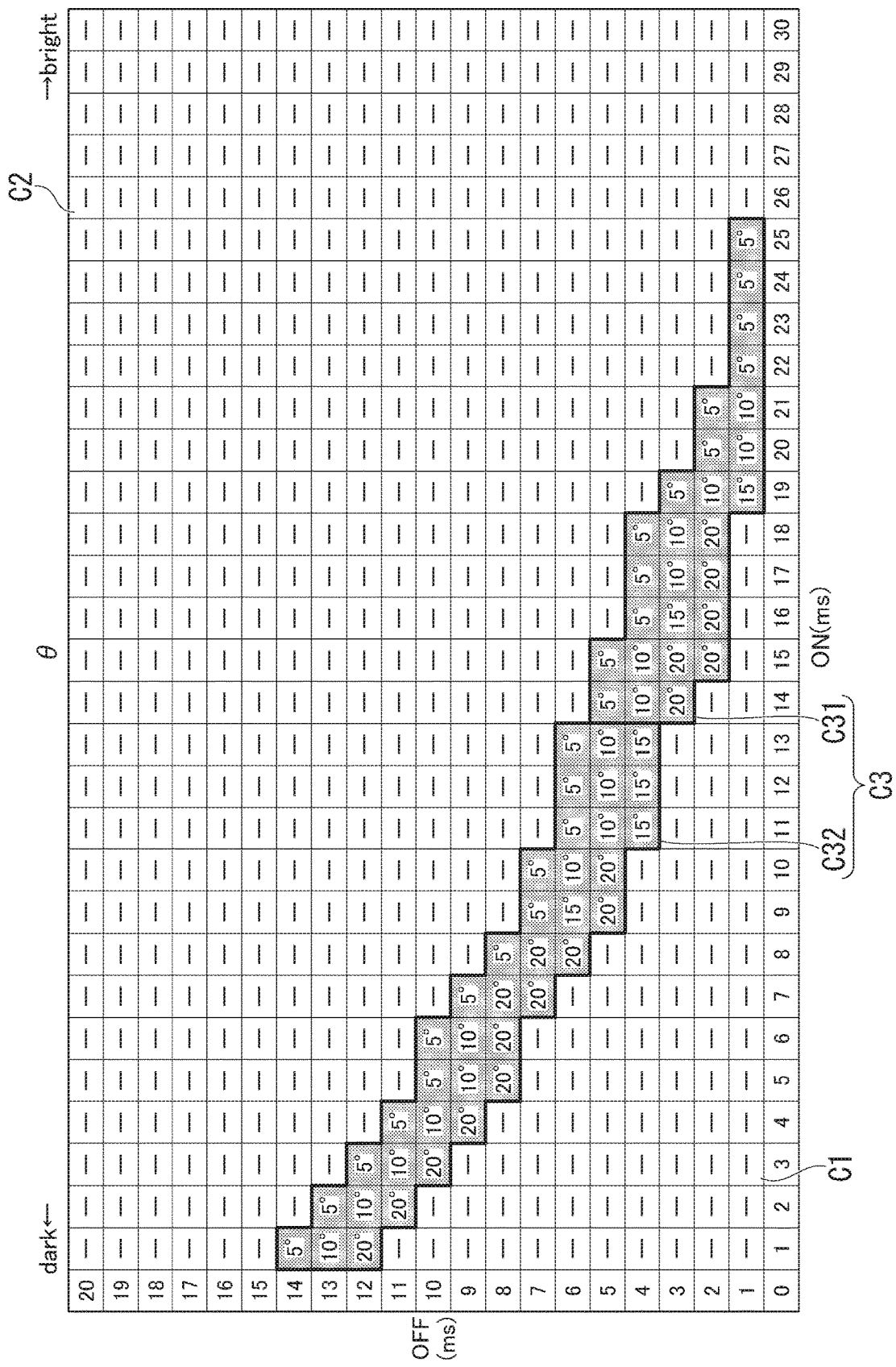
FIG. 7 is a graph showing a relation between a viewing angle of a viewer in a vertical direction and usable pulse conditions.

FIG. 6 is a graph showing a relation between a viewing angle θ of a viewer 10 in a horizontal direction and usable pulse conditions. FIG. 7 is a graph showing a relation between a viewing angle θ of a viewer 10 in a vertical direction and usable pulse conditions. In FIGS. 6 and 7, the horizontal axes of the graphs represent the on-pulse time T1. The vertical axes of the graphs represent the off-pulse time T2. Values0 written within the graphs represent viewing angles θ (see FIGS. 3 and 4) at which switching between remaining on and blinking of the light source 3 is performed in a case in which the light source is caused to emit light with a corresponding on-pulse time T1 and off-pulse time T2. More specifically, for example, the viewing angles θ shown in FIGS. 6 and 7 are experiment values of the viewing angles θ at the time of the method of viewing the light source 3 being conceived to be switched from remaining on to blinking when the gazing point 13 of the viewer 10 is fixed, and the light source 3 caused to emit light at a predetermined frequency F is gradually moved to the outer side from the gazing point 13 of the viewer 10 in the horizontal direction or the vertical direction.

In FIG. 6, an area B1 represents an area in which blinking is not visually perceived, in other words, a range of pulse conditions in which the light source 3 is seen to be turned on in the central visual field 14 and the peripheral visual field 15. An area B2 represents a range of pulse conditions under which the light source 3 is seen to be blinking in both the central visual field 14 and the peripheral visual field 15. An area B3 represents a range of pulse conditions that can be used for the attention attracting device 1 according to this embodiment. In other words, the area B3 represents a range of pulse conditions under which the light source 3 is seen to continuously remain on in a case in which the light source 3 is present in the central visual field 14 positioned within a predetermined viewing angle θ in the horizontal direction in the visual field of the viewer 10, and the light source 3 is seen to be blinking in a case in which the light source 3 is present in the peripheral visual field 15 positioned outside of the predetermined viewing angle θ. The light source 3 is brighter in an area disposed further to the right in the graph.

As shown in FIGS. 3 and 6, the range of the central visual field 14 in the horizontal direction is distributed in the range of 5° to 50° of the viewing angle θ with respect to the visual line 12. The usable area B3 in the visual field in the horizontal direction can be further divided into a practical area B31 and a non-practical area B32 that is darker than the practical area B31. The practical area B31 is an area, in which the light source 3 can be switched between continuous remaining-on and blinking in the central visual field 14 and the peripheral visual field 15, having sufficient brightness. The light source 3 is more preferably used under pulse conditions of the practical area B31 in the usable area B3. More specifically, in the practical area B31, the on-pulse time T1 of the light source 3 is equal to or longer than 14 ms and equal to or shorter than 25 ms, and the off-pulse time T2 is equal to or longer than 1 ms and equal to or shorter than 5 ms.

In FIG. 7, an area C1 is an area corresponding to the area B1 in the horizontal visual field described above and represents an area in which blinking is not visually conceived, in other words, a range of pulse conditions under which the light source 3 is seen to be turned on in both the central visual field 14 and the peripheral visual field 15. An area C2 is an area corresponding to the area B2 in the horizontal visual field described above and represents a range of pulse conditions under which the light source 3 is seen to be blinking in both the central visual field 14 and the peripheral visual field 15. An area C3 is an area corresponding to the area B3 in the horizontal visual field described above and represents a range of usable pulse conditions under which the light source 3 can be used as the attention attracting device 1 according to this embodiment. In other words, the area C3 represents a range of pulse conditions under which the light source 3 is seen to continuously remain on in a case in which the light source 3 is present in the central visual field 14 positioned within a predetermined viewing angle θ in the vertical direction among visual fields of the viewer 10, and the light source 3 is seen to be blinking in a case in which the light source 3 is present in the peripheral visual field 15 positioned outside the predetermined viewing angle θ. The light source 3 is brighter in an area disposed on a further right side of the graph.

As shown in FIGS. 4 and 7, the range of the central visual field 14 in the vertical direction is distributed in the range of 5° to 50° of the viewing angle θ with respect to the visual line 12. The usable area C3 in a visual field in the vertical direction can be further divided into a practical area C31 and a non-practical area C32 that is darker than the practical area C31. The practical area C31 and the non-practical area C32 are areas respectively corresponding to the practical area B31 and the non-practical area B32 in the horizontal visual field described above. The practical area C31 is an area in which the light source 3 can be switched between continuous remaining-on and blinking in the central visual field 14 and the peripheral visual field 15, and the light source 3 has sufficient brightness. The light source 3 is more preferably used under pulse conditions of the practical area C31 in the usable area C3. More specifically, in the practical area C31, the on-pulse time T1 of the light source 3 is equal to or longer than 14 ms and equal to or shorter than 25 ms, and an off-pulse time T2 is equal to or longer than 1 ms and equal to or shorter than 5 ms.

As can be known by comparing FIG. 6 with FIG. 7, the range of pulse conditions in which the effect of attention attracting according to switching between turning-on and blinking of the light source 3 is narrower in the vertical visual field than in the horizontal visual field. In other words, in the visual field in the vertical direction, the central visual field is narrow. Particularly, it is experimentally known that the effect range on a side lower than the gazing point 13 is narrower than a side higher than the gazing point 13 in the vertical direction.

Thus, for example, it is preferable that pulse conditions of the light source 3 are set to conditions under which effects can also be acquired in the vertical visual field (particularly, a side lower than the gazing point 13). In such a case, the effects of attention attracting can be acquired to be effective in both the horizontal visual field and the vertical visual field. The pulse conditions of the light source 3 are not limited thereto, and the pulse conditions may be set in accordance with the use of the attention attracting device 1.

Figure 8:
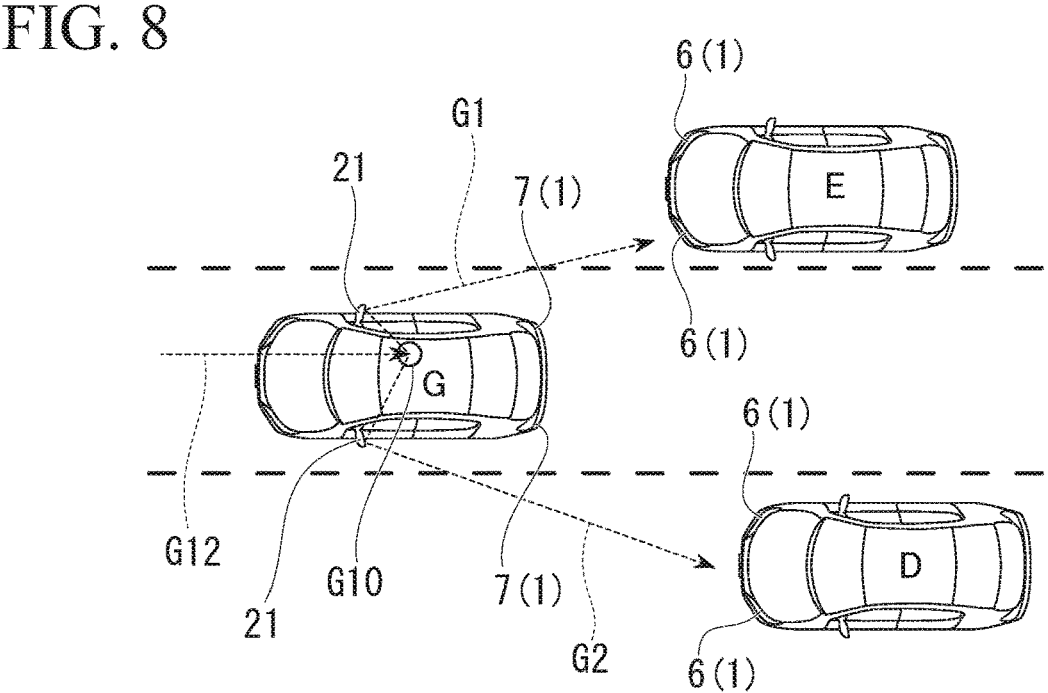
FIG. 8 is a schematic view showing a first scenario in which an attention attracting device according to an embodiment exhibits effects.

FIG. 8 is a schematic view showing a first scenario in which the attention attracting device according to the embodiment exhibits effects. In the example shown in FIG. 8, for example, a situation in which vehicles D, E, and G having the attention attracting device 1 mounted therein are traveling in parallel on a one-way three-lane road will be described as an example.

As shown in FIG. 8, the vehicle D is traveling in a leftmost lane. The vehicle E is traveling in a rightmost lane. The vehicle G is traveling in a center lane. The vehicle G traveling in the center lane is traveling in front of the vehicles D and E. In the example shown in FIG. 8, each of at least two vehicles D and E traveling at the back includes the light source 3 of the attention attracting device 1 in a front part (for example, headlights 6 and the like) of the vehicle.

For example, a driver G10 of the vehicle G has a visual line G12 focusing and directed forward, in other words, gazes forward. At this time, there are cases in which the vehicles D and E shown in side-view mirrors 21 of the vehicle G using arrows G1 and G2 as optical paths are positioned in a peripheral visual field of the driver G10 of the vehicle G. For this reason, there is a likelihood that the driver G10 of the vehicle G does not notice the presence of the following vehicles D and E and performs a lane change and the like. In a case in which the vehicles D and E have the light source 3 of the attention attracting devices 1 mounted therein, the light sources 3 of the following vehicles D and E enter the peripheral visual field when seen by the driver G10 of the vehicle G, and the light sources 3 are seen to be blinking. In accordance with this, for example, when a lane change is performed, the driver G10 of the vehicle G can easily notice the presence of the following vehicles D and E shown in the side-view mirrors 21.

For example, a situation in which a two-wheeled vehicle (not shown) passes between the vehicles D, E, and G from the backside and goes out forward in FIG. 8 may be assumed. In such a situation, in a case in which the light sources 3 of the attention attracting device 1 are mounted as the headlights of the two-wheeled vehicle, the presence of the passing two-wheeled vehicle can be easily recognized by the vehicles D, E, and G.

In the example shown in FIG. 8, for example, as brake lights 7 of the vehicle G traveling forward, the light sources 3 of the attention attracting device 1 may be mounted. In such a case, the following vehicles D and E can more easily recognize a brake operation of the vehicle G.

Figure 9:
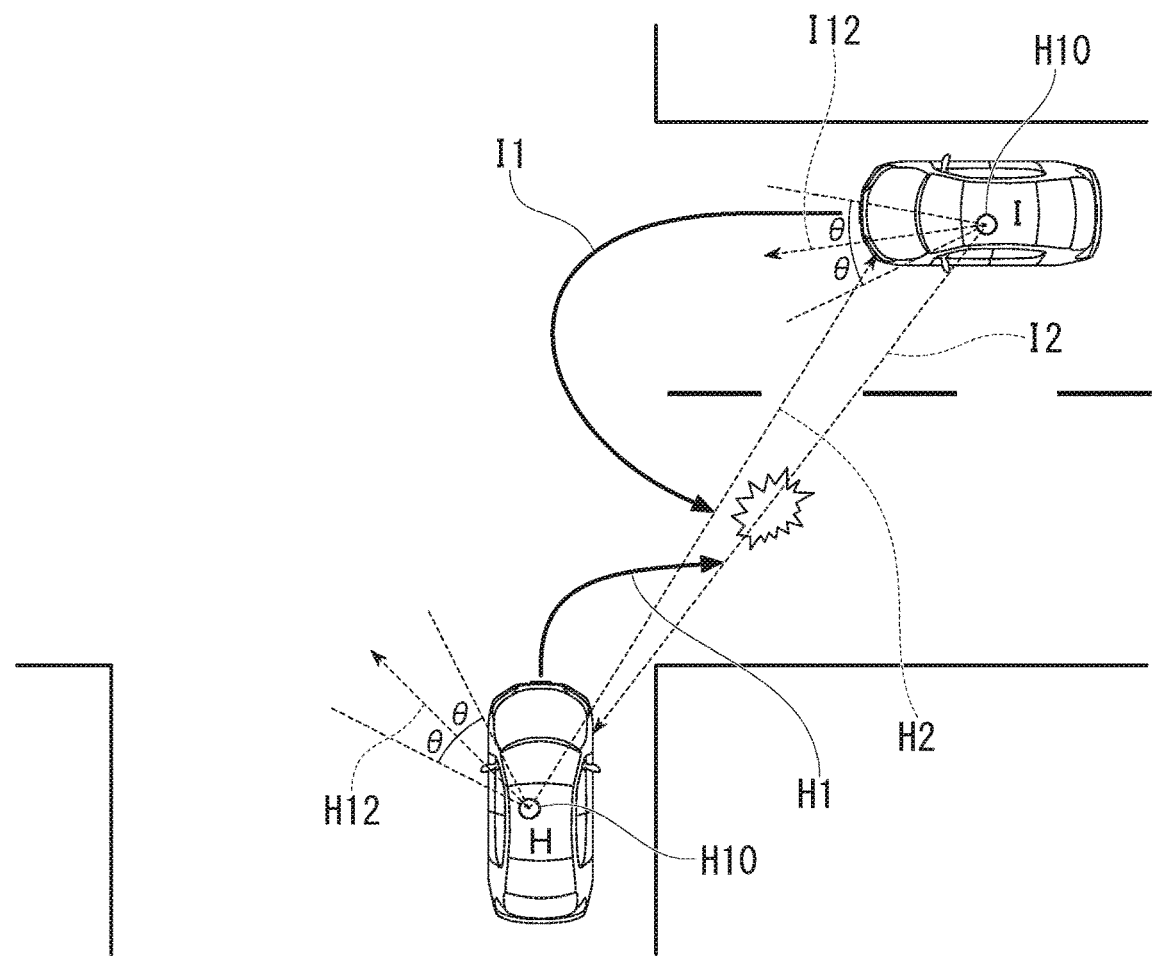
FIG. 9 is a schematic view showing a second scenario in which an attention attracting device according to an embodiment exhibits effects.

FIG. 9 is a schematic view showing a second scenario in which the attention attracting device according to the embodiment exhibits effects. In the example shown in FIG. 9, for example, two vehicles H and I entering an intersection from orthogonal directions of the intersection at which one-way one-lane roads intersect each other will be described as an example. Arrows H1 and I1 respectively represent (planned) moving paths of the vehicles H and I.

As shown in FIG. 9, after entering the intersection from a right lane in a first direction and temporarily stopping, the vehicle H is going to make a right turn in a second direction that is orthogonal to the first direction. The vehicle I enters the intersection from a road that is a destination into which the vehicle H makes a right turn and is going to make a U-turn at the intersection. At this time, in order to wait for the pause of a vehicle traveling in the second direction, a driver H10 of the vehicle H is directed toward a visual line H12 on the left side of his or her own vehicle. On the other hand, in order to check that there is no oncoming vehicle, a driver I10 of the vehicle I directs a visual line I12 in the oncoming vehicle direction. A range within a predetermined viewing angle θ with respect to the visual lines H12 and I12 is regarded as a central visual field, and another range is regarded as a peripheral visual field.

At this time, there are cases in which the vehicle I shown in the visual field of the driver H10 of the vehicle H using an arrow H2 as its optical path is positioned in the peripheral visual field of the driver H10 of the vehicle H. There are cases in which the vehicle H shown in the visual field of the driver I10 of the vehicle I using an arrow I2 as its optical path is positioned in the peripheral visual field of the driver I10 of the vehicle I. For this reason, the driver H10 of the vehicle H and the driver I10 of the vehicle I recognize the presence of the other party (vehicle) immediately after making a right turn or a U-turn, and there is a likelihood of a timing for noticing the presence of the other party being late. In a case in which the vehicles H and I have the light sources 3 of the attention attracting devices 1 mounted therein, the light source 3 of the other party is seen to be blinking. In accordance with this, for example, the driver H10 of the vehicle H making a right turn at the intersection and the driver I10 of the vehicle I making a U-turn can easily recognize the presence of the other party at an earlier stage.

Figure 10:
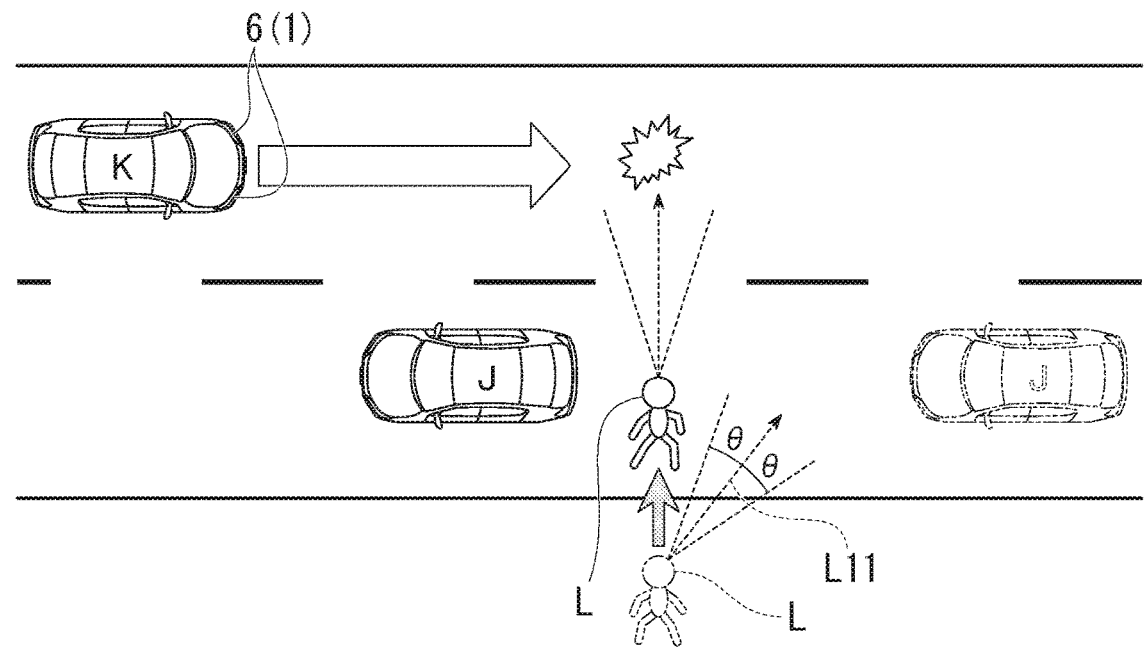
FIG. 10 is a schematic view showing a third scenario in which an attention attracting device according to an embodiment exhibits effects.

FIG. 10 is a schematic view showing a third scenario in which the attention attracting device according to the embodiment exhibits effects.

In the example shown in FIG. 10, for example, vehicles J and K traveling on a one-way one-lane road and a pedestrian L about to cross this road will be described as an example.

As shown in FIG. 10, the pedestrian L is about to cross the road. The vehicle J travels in a lane on a side close to the pedestrian L before he or she crosses the road. The vehicle J is traveling from the right side to the left side when seen by the pedestrian L. The vehicle K is traveling on an opposing lane of the vehicle J, in other words, a lane on a side far from the pedestrian L. Immediately before crossing the road, the pedestrian L, in order to check presence/absence of the vehicle J traveling in a lane on a side close to him or her, directs a visual line L11 to a right side with respect to his or her traveling direction. The pedestrian L starts to cross the road after checking the passage of the vehicle J.

At this time, there are cases in which the vehicle K traveling from the left side to the right side in a lane on a side far from the pedestrian L is positioned in the peripheral visual field of the pedestrian L immediately before he or she crosses the road. For this reason, there is a likelihood of a timing at which the pedestrian L notices the presence of the vehicle K being late. For example, in a case in which the vehicle K has the light sources 3 of the attention attracting device 1 mounted therein as the headlights 6, even when the pedestrian L gazes at the right side, the light sources 3 of the vehicle K are seen to be blinking by the pedestrian L. In accordance with this, the pedestrian L can easily notice the presence of the vehicle K at an earlier stage.

Figure 11:
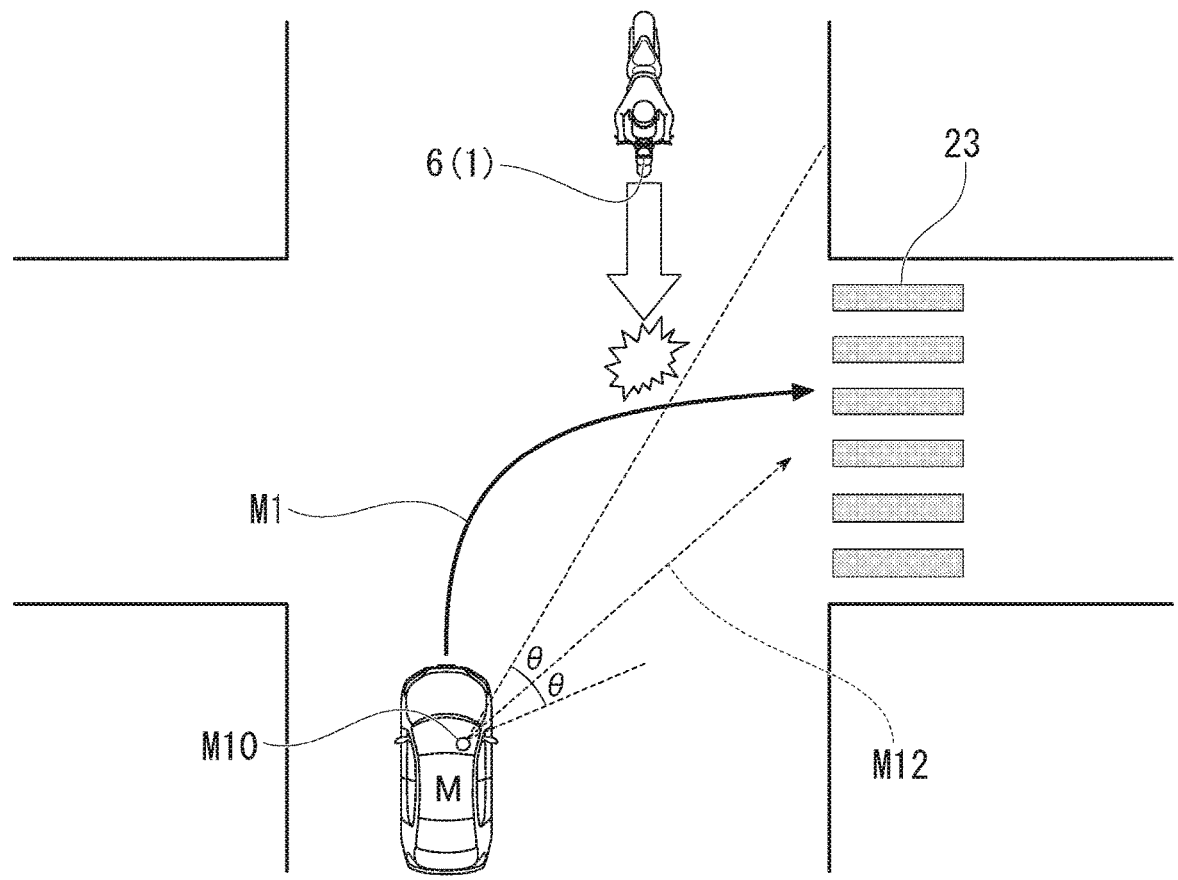
FIG. 11 is a schematic view showing a fourth scenario in which an attention attracting device according to an embodiment exhibits effects.

FIG. 11 is a schematic view showing a fourth scenario in which the attention attracting device according to the embodiment exhibits effects. In the example shown in FIG. 11, for example, a vehicle M and a two-wheeled vehicle N entering an intersection in opposing directions of the intersection at which two roads intersect each other will be described as an example. An arrow M1 represents a (planned) moving path of the vehicle M.

As shown in FIG. 11, the vehicle M enters the intersection in a first direction and is going to make a right turn in a second direction that is orthogonal to the first direction. On the road immediately after the right turn, a crosswalk 23 is disposed. The two-wheeled vehicle N enters the intersection from a side opposite to the vehicle M in the first direction and tries to continue straight. At this time, for example, in order to check the situation of the crosswalk 23 immediately after making the right turn, a driver M10 of the vehicle M directs a visual line M12 to the right side on which the crosswalk 23 is present.

At this time, there are cases in which the two-wheeled vehicle N shown in the visual field of the driver M10 of the vehicle M gazing at the crosswalk 23 is positioned in the peripheral visual field of the driver M10 of the vehicle M. For this reason, there is a likelihood of a timing at which the driver M10 of the vehicle M notices the two-wheeled vehicle N going straight in an opposing lane being late. In a case in which the two-wheeled vehicle N has the light source 3 of the attention attracting device 1 being mounted therein, the light source 3 is seen to be blinking by the driver M10 of the vehicle M. In accordance with this, for example, the driver M10 of the vehicle M making a right turn at the intersection at which the crosswalk 23 is disposed can recognize the presence of the two-wheeled vehicle N going straight at an earlier stage.

Figure 12:
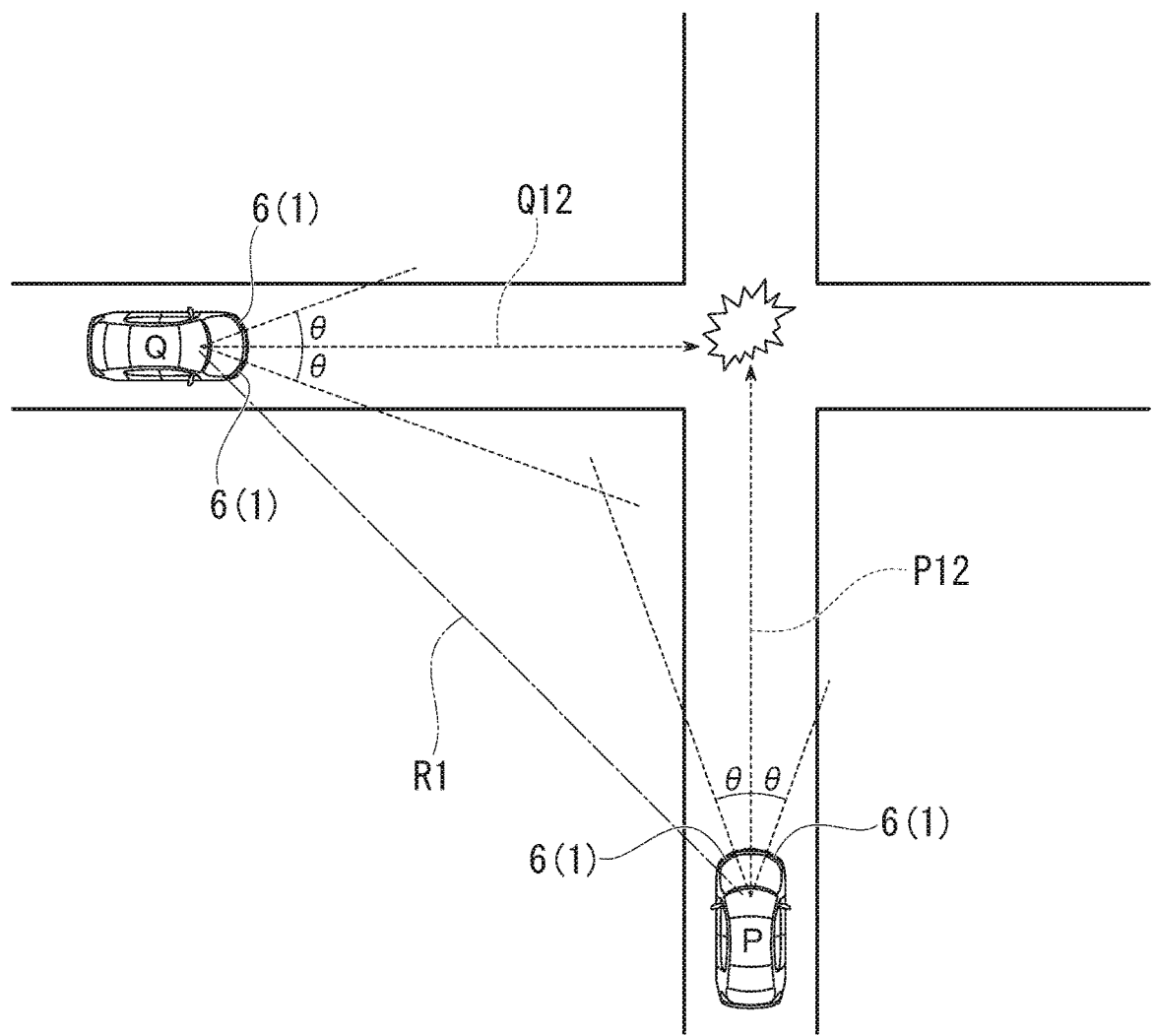
FIG. 12 is a schematic view showing a fifth scenario in which an attention attracting device according to an embodiment exhibits effects.

FIG. 12 is a schematic view showing a fifth scenario in which the attention attracting device according to the embodiment exhibits effects. In the example shown in FIG. 12, for example, two vehicles P and Q entering an intersection with an equal speed at the same timing in orthogonal directions of the intersection at which two roads intersect each other will be described as an example. An arrow R1 is a straight line that joins the vehicle P and the vehicle Q.

As shown in FIG. 12, the vehicle P is going straight on a road in a first direction and is going to enter the intersection. The vehicle Q is going straight on a road in a second direction that is orthogonal to the first direction and is going to enter the intersection. At this time, a driver P10 of the vehicle P directs a visual line P12 in the first direction that is a traveling direction of his or her own vehicle. The driver Q10 of the vehicle Q directs a visual line Q12 in the second direction that is a traveling direction of his or her own vehicle. The speeds of the vehicle P and the vehicle Q are balanced, and a distance from the vehicle P to the intersection and a distance from the vehicle Q to the intersection are almost equal.

At this time, since the speeds of the vehicles P and Q are balanced, there are cases in which the opposing vehicle is apparently seen not moving. In addition, when the two roads are almost orthogonal to each other, there are cases in which the vehicle P is positioned in a peripheral visual field of the driver Q10 of the vehicle Q. Similarly, there are cases in which the vehicle Q is positioned in a peripheral visual field of the driver P10 of the vehicle P. For example, there is a likelihood of a timing at which each of the drivers P10 and Q10 of the vehicles P and Q notices the other vehicle Q and P entering the intersection at the same time being late. In a case in which the vehicles P and Q have the light sources 3 of the attention attracting devices 1 mounted therein, the light source 3 of the other vehicle is seen to be blinking by the drivers P10 and Q10 of the vehicles P and Q. In accordance with this, each of the drivers P10 and Q10 of the two vehicles P and Q entering the intersection with balanced speeds at the same time can easily recognize the presence of the other vehicle at an earlier stage.

(Method for Controlling Attention Attracting Device)

Next, a method for controlling the attention attracting device 1 that is used for controlling the attention attracting device 1 disposed in the mobile body 2 described above will be described.

In the method for controlling the attention attracting device 1, the frequency F of the light source 3 is changed in accordance with the state of the mobile body 2 within a range of the frequency F in which the light source is seen to be turned on in a case in which it is present in the central visual field 14 and is seen to be blinking in a case in which it is present in the peripheral visual field 15.

For example, the state of the mobile body 2 is a state according to a speed during traveling, a state according to whether or not the mobile body 2 is stopping, an urgent braking and hazard operation state, or the like. For example, the frequency F of the light source 3 may be controlled such that the frequency F decreases in accordance with an increase in the speed of the mobile body 2. In the case of setting as such, for example, a color, the strength of blinking, and the like of light from the light source 3 can be expressed more accurately for the viewer 10. Thus, the attention attracting device 1 can be also applied to the mobile body 2 that is approaching at a high speed.

In addition, in the method for controlling the attention attracting device 1, not only the frequency F but also pulse conditions of the light source 3 including the on-pulse time T1 and the off-pulse time T2 may be controlled. For example, the strength, the brightness, and the like of blinking of the light source 3 may be changed by changing such pulse conditions in accordance with presence/absence of an urgent braking and hazard operation and a time frame.

(Operations and Effects)

Next, operations and effects of the attention attracting device 1, the mobile body 2, and the method for controlling the attention attracting device 1 described above will be described.

According to the attention attracting device 1 of this embodiment, the frequency F of the light source 3 disposed in the attention attracting device 1 is set such that it is seen to be turned on in a case in which it is present in the central visual field 14 and is seen to be blinking in a case in which it is present in the peripheral visual field 15. Here, it is known that the visual field of a person has higher time resolution in the peripheral visual field 15 than in the central visual field 14 positioned in front of the visual line 12 including the gazing point 13. For this reason, when the light source 3 is caused to emit light at a specific frequency F, in the central visual field 14, blinking cannot be detected, and thus, the light source 3 is seen to continuously remain on. When the light source 3 deviates from the central visual field 14 and enters the peripheral visual field 15, blinking can be detected. By setting such a frequency F, the light source 3 positioned in the peripheral visual field 15 of the viewer 10 is blinking and strongly moves in the pupil of the viewer 10, and thus, the viewer 10 can be made to gaze in the direction of the light source 3. Thus, attention attracting is prompted in the peripheral visual field 15 far from the gazing point 13 of the viewer 10, and a risk from an unexpected direction can be easily sensed.

On the other hand, in the central visual field 14, the light source 3 is seen to be turned on, and thus, when the viewer 10 gazes at the light source 3, inconvenience due to blinking of the light source 3 can be reduced. In addition, in a case in which the position of the light source 3 moves from the central visual field 14 to the peripheral visual field 15, an appearance change can be large in accordance with changing from continuous remaining-on to blinking. In accordance with this, the visibility of the light source 3 is improved, and the effects of attention attracting can be further improved. In addition, since switching between turning-on and blinking of the light source 3 is performed in accordance with visual characteristics of humans, switching to a blinking operation is not required through communication using a sensor and the like. Thus, compared to a conventional technology in which switching to a display operation or a blinking operation is performed based on a detection result acquired by a sensor or the like, the attention attracting device 1 can be applied to a wider variety of purposes and situations.

Therefore, the attention attracting device 1 that effectively performs attention attracting and has improved versatility over the conventional technology can be provided.

The light source 3 prompts the viewer 10 to pay attention by blinking in the peripheral visual field 15 of the viewer 10. In accordance with this, the attention attracting device 1 having a simple configuration and capable of effective attention attracting using visual characteristics of humans can be acquired.

Particularly, for example, by using such a light source 3 for an advertisement requiring gazing, various display lamps during driving, and the like, the viewer 10 can more easily direct the visual line 12 in the direction of the light source 3, and attention attracting can be effectively performed for various uses.

The light source 3 is set to a predetermined frequency F by alternately repeating the on state S1 in which the light source 3 is caused to emit light and the off state S2 in which the light source 3 is turned off. For example, a light emitting diode (LED) is used as such a light source 3. One on-pulse time T1 is longer than one off-pulse time T2. By setting the frequency F of the light source 3 as such, the light source can be seen to be turned on in a case in which it is present in the central visual field 14 and can be seen to be blinking in a case in which it is present in the peripheral visual field 15. In a case in which the LED is used, by only changing the on-pulse time T1 and the off-pulse time T2, the operations described above can be performed. Thus, a component such as a frequency F conversion device does not need to be additionally provided, and the effects of the attention attracting device 1 can be improved using a simple configuration.

The central visual field 14 is set to a range within 20° of the visual line 12 of the viewer 10. In the practical area A31, the on-pulse time T1 of the light source 3 is set to be equal to or longer than 14 ms and equal to or shorter than 25 ms, and the off-pulse time T2 is set to be equal to or longer than 1 ms and equal to or shorter than 5 ms. In accordance with this, the light source 3 is seen to be turned on in the central visual field 14 that is within 20° (in other words, within the viewing angle 20°) from the center (the gazing point 13) of the visual line 12 of the viewer 10. The light source 3 is seen to be blinking in the peripheral visual field 15 that is outside the viewing angle θ20° from the gazing point 13. Thus, the attention attracting device 1 capable of effectively attracting attention in the peripheral visual field 15 of the viewer 10 can be provided.

In addition, by using a combination of the on-pulse time T1 and the off-pulse time T2, for example, appearance characteristics such as brightness, and strength of blinking (visibility of blinking) of the light source 3 can be changed in accordance with a use. Therefore, the versatility of the attention attracting device 1 can be improved.

According to the mobile body 2 of this embodiment, the mobile body 2 includes the attention attracting device 1 described above and emits light from the light source 3 to the outside. Such a light source 3, for example, may be a light source 3 that is disposed inside the mobile body 2 and emits light to leak to the outside from the inside or a light source 3 that is disposed outside the mobile body 2 and emits light to the outside. In accordance with this, light of the light source 3 of the mobile body 2 can be visually recognized by at least pedestrians present on the periphery of the mobile body 2, drivers riding in the other mobile bodies 2, and the like. Thus, the pedestrians, the drivers of the other mobile bodies 2, and the like can be effectively prompted to pay attention and can be made to recognize an approach of the mobile body 2 and the like. Particularly, in a situation in which the viewer 10 is required to gaze such as during driving, attention attracting is prompted in the peripheral visual field 15 far from the gazing point 13 of the viewer 10, and a risk from an unexpected direction can be easily sensed. In accordance with this, for example, the visibility of the mobile body 2 seen by pedestrians and drivers of the other mobile bodies 2 can be improved.

Therefore, the mobile body 2 including the attention attracting device 1 that effectively performs attention attracting and has improved versatility over the conventional technology can be provided.

As a lamp body of the vehicle, the light source 3 is used. By substituting various lamp bodies such as the headlights 6 and taillights (not shown) mounted in the vehicle in advance with the light source 3 described above and using the light source 3, the attention attracting device 1 can be easily mounted in the vehicle. In addition, inside such lamp bodies, a main lamp and a lamp for attracting attention may be provided as separate bodies. In such a case, the versatility of the attention attracting device 1 mounted in the vehicle can be improved.

The light source 3 is used as the headlight 6 of the vehicle, and the light source 3 is caused to emit light forward from the vehicle. By using a lamp as both the light source 3 for attention attracting and the headlight 6 of the vehicle, the configuration of lighting components mounted in the vehicle is simplified, and the number of the components can be reduced. Since the headlight 6 functions as the attention attracting device 1, for example, when the light from the headlight 6 enters the peripheral visual field 15 of a pedestrian present in front of the vehicle, the headlight 6 is seen to be blinking, and thus, the presence of the vehicle can be easily noticed. Thus, pedestrians can be effectively made to pay attention. In addition, for example, when the light from the headlight 6 of a following vehicle enters the peripheral visual field 15 of the driver through a rearview mirror or a side-view mirror, the headlight 6 is seen to be blinking, and thus, the presence of the following vehicle can be easily noticed. Accordingly, the surrounding situations can be appropriately perceived.

The light source 3 is used as the brake light 7 of the vehicle. By using a lamp as both the light source 3 for attention attracting and the brake light 7 of the vehicle, the configuration of lighting components mounted in the vehicle is simplified, and the number of the components can be reduced. Since the brake light 7 functions as the attention attracting device 1, for example, when the brake light 7 enters the peripheral visual field 15 of a driver of the following vehicle traveling at the back of its own vehicle, the brake light 7 is seen to be blinking, and thus, the presence of the own vehicle can be easily noticed. Thus, the driver of the following vehicle can be can be effectively made to pay attention.

A plurality of light sources 3 are disposed in a width direction that is orthogonal to the traveling direction, and the frequencies F of the plurality of light sources 3 are equal. By causing the plurality of light sources 3 to blink in synchronization with each other, the light sources can be easily recognized as one mobile body 2 even from a distance. For example, in a case in which a plurality of light sources 3 are disposed in a horizontal direction (a vehicle width direction) of the vehicle, a four-wheeled vehicle and a two-wheeled vehicle can be easily distinguished based on distances between the plurality of light sources 3. In this way, the surrounding situations can be appropriately perceived.

According to the method for controlling the attention attracting device 1, the frequency F of the light source 3 is changed in accordance with the state of the mobile body 2 in a range of the frequency F in which the light source 3 is seen to be turned on in a case in which it is present in the central visual field 14, and the light source 3 is seen to be blinking in a case in which it is present in the peripheral visual field 15. The frequency F of the light source 3 is controlled, for example, based on various states of the mobile body 2 such as a moving speed, presence/absence of urgent braking, and the like of the mobile body 2. In accordance with this, more effective attention attracting can be prompted in accordance with certain situations. Since attention attracting can be prompted for more various situations, the use of the attention attracting device 1 mounted in the mobile body 2 can be expanded.

Therefore, the method for controlling the attention attracting device 1 that is used for controlling the attention attracting device 1 that effectively performs attention attracting and has improved versatility over the conventional technology can be provided.

Modified Example of Embodiment

Next, a modified example of this embodiment will be described with reference to FIG. 1. In the modified example of the embodiment, frequencies F of one pair of light sources 3 disposed in a vehicle width direction are different from each other, which is different from the embodiment described above. In the following description, the same reference signs will be assigned to components similar to those of the embodiment described above, and description thereof will be appropriately omitted.

In the modified example, one pair of light sources 3 of an attention attracting device 1 are disposed in a vehicle width direction of a vehicle. The one pair of the light sources 3 aligned in the vehicle width direction are set to pulse conditions different from each other. The frequencies F of the one pair of the light sources 3 are different from each other.

In addition, a plurality of light sources 3 may be disposed in the vehicle width direction of the vehicle. In such a case, the frequencies F of at least one pair of light sources 3 among the plurality of light sources 3 are different from each other.

According to the mobile body 2 of the modified example, a plurality of light sources 3 are disposed in a width direction that is orthogonal to a traveling direction, and the frequencies of at least one pair of light sources 3 among the plurality of light sources 3 are different from each other. Since blinking operations of one pair of light sources 3 are different from each other, the viewer 10 is caused to feel a sense of discomfort, and a stronger attention attracting action can be achieved.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the embodiment described above, although the range within 20° of the visual line 12 is defined as the central visual field 14, the value of the viewing angle θ setting the central visual field 14 may be different than 20°. In such a case, pulse conditions and the like may be set using the set viewing angle θ as a reference. However, the configuration of this embodiment in which the central visual field 14 is set to the viewing angle θ20° of the visual line 12 has superiority in that effects are effectively exhibited for more viewers 10.

In this embodiment, although an example in which the attention attracting device 1 is mounted in the four-wheeled vehicle has been described, the configuration is not limited thereto. For example, the attention attracting device 1 may be mounted in a vehicle such as a two-wheeled vehicle. In addition, the attention attracting device 1 may be mounted in a mobile body 2 other than a vehicle.

The use of the attention attracting device 1 is not limited to the mobile body 2. For example, the light sources 3 of the attention attracting device 1 may be used as light sources 3 of advertisements, various liquid crystal displays, and the like at which persons are required to gaze. In such a case, persons can be made to gaze at the advertisements, the liquid crystal displays, and the like.

Other than that, in a range not departing from the concept of the present invention, a constituent element according to the embodiment described above can be appropriately substituted with a known constituent element, and the embodiments described above may be appropriately combined.

EXPLANATION OF REFERENCES

1 Attention attracting device
2 Mobile body
3 Light source
6 Headlight (lamp body)
7 Brake light (lamp body)
10 Viewer
12 Visual line
13 Gazing point
14 Central visual field
15 Peripheral visual field
F Frequency
S1 On state
S2 Off state
T1 On-pulse time
T2 Off-pulse time

What is claimed is:

1. An attention attracting device comprising:
a light source set to such a frequency that the light source is seen to be turned on in a case in which the light source is present in a central visual field and is seen to be blinking in a case in which the light source is present in a peripheral visual field when a predetermined area including a gazing point of a viewer is set as the central visual field at a time of the viewer directing a visual line, and an area other than the central visual field is set as the peripheral visual field.

2. The attention attracting device according to claim 1, wherein the light source prompts the viewer to pay attention by blinking in the peripheral visual field of the viewer.

3. The attention attracting device according to claim 1,
wherein the light source is set to a predetermined frequency by alternately repeating an on state in which the light source is caused to emit light and an off state in which the light source is turned off, and
wherein an on-pulse time for which the on state is maintained once is longer than an off-pulse time for which the off state is maintained once.

4. The attention attracting device according to claim 3,
wherein the central visual field is set to a range within 20° of the visual line of the viewer, and
wherein, in the light source, the on-pulse time is set to be equal to or longer than 14 ms and equal to or shorter than 25 ms, and the off-pulse time is set to be equal to or longer than 1 ms and equal to or shorter than 5 ms.

5. A mobile body comprising:
the attention attracting device according to claim 1,
wherein light from the light source is emitted to the outside.

6. The mobile body according to claim 5, wherein the light source is used as a lamp body of a vehicle.

7. The mobile body according to claim 6, wherein the light source is used as a headlight of the vehicle, and the light source is caused to emit light forward from the vehicle.

8. The mobile body according to claim 6, wherein the light source is used as a brake light of the vehicle.

9. The mobile body according to claim 5,
wherein a plurality of light sources are disposed in a width direction that is orthogonal to a traveling direction, and
wherein frequencies of the plurality of light sources are equal.

10. The mobile body according to claim 5,
wherein a plurality of light sources are disposed in a width direction that is orthogonal to a traveling direction, and
wherein frequencies of at least one pair of light sources among the plurality of light sources are different from each other.

11. A method for controlling an attention attracting device that is used for controlling the attention attracting device disposed in the mobile body according to claim 5, the method comprising:
changing the frequency of the light source in accordance with a state of the mobile body within a range of a frequency band in which the light source is seen to be turned on in a case in which the light source is present in the central visual field and is seen to be blinking in a case in which the light source is present in the peripheral visual field.

* * * * *